3,046,260
DETERGENT COPOLYMER
William T. Stewart, El Cerrito, Frank A. Stuart, Orinda, and Warren Lowe, San Francisco, Calif., assignors to California Research Corporation, San Francisco, Calif., a corporation of Delaware
No Drawing. Original application Feb. 3, 1956, Ser. No. 563,206, now Patent No. 2,892,786, dated June 30, 1959. Divided and this application Feb. 12, 1958, Ser. No. 714,695
2 Claims. (Cl. 260—80.5)

This invention relates to a novel copolymer and is particularly directed to detergent copolymers which are adapted to be used in detergent compositions.

This application is a division of Stewart, Stuart and Lowe patent application Serial No. 563,206, filed February 3, 1956, issued June 30, 1959, as U.S. Patent No. 2,892,786, which in turn is a continuation-in-part of Stewart, Stuart and Lowe, patent application Serial No. 312,392, filed September 30, 1952, and now abandoned; Stuart, Lowe and Stewart, patent application Serial No. 328,152, filed December 26, 1952, and now abandoned; and Lowe, Stewart and Stuart, patent application Serial No. 363,679, filed June 23, 1953, and now abandoned.

With the refinements now being made in automotive and other internal combustion engines, a great deal of attention is being directed to the provision of a lubricant which will permit the engine to be operated at a high level of efficiency over long periods of time. The primary function of the lubricant is, of course, to reduce friction and thereby not only decrease the wear on pistons, piston walls, bearings and other moving parts, but also increase the efficiency of the engine. Additionally, it is also a function of the lubricant to prevent the deposition of solid products on the piston walls and other surfaces of the engine coming in contact with the lubricant. Such deposits seriously interfere with efficient engine operation for they accelerate piston ring and cylinder wall wear and also increase oil losses by plugging the oil ring grooves. The troublesome deposits which form on the face of the piston and on the other walls of the combustion chamber, as well as on valves and spark plugs are also partially attributable in many cases to the lubricant, and especially to various of the metal-containing additives employed therein. It is of importance to eliminate or at least minimize the formation of all such deposits, and it is the basic object of this invention to achieve such a result.

To a minor degree, certain of the deposits formed on engine surfaces have their origin in the oil itself, that is to say, in the decomposition products of the oil. A more important, though still minor, source of engine deposits lies in the additives with which oils are conventionally supplied. This is particularly the case with metal-containing additives as, for example, the organic, metal-containing salts which are incorporated in the oil to increase the detergency thereof and the various metal-containing compounds which are added to increase the lubricity of the oil and reduce piston ring and cylinder wall wear. Whenever oil is burned in the engine (as occurs with the oil film present in the cylinder wall during the combustion stroke) any metal-containing additives present in the oil may form an ash which is partially deposited out on the various surfaces of the combustion chamber and on those of the spark plugs and valves. Accordingly, it is a particular object of this invention to provide a lubricant composition which is compounded with metal- or mineral-free detergents and wear-reducing additives.

While certain of the additives heretofore employed in oils (and to a lesser degree the oil itself) are partially responsible for deposits which form on engine surfaces, it is now recognized that the major source of such deposits or their precursors lies in the various aldehydes, acids, oxyacids and other similarly reactive, partially-oxidized combustion products of the fuel. These products are formed both under pre-ignition conditions as well as during the combustion step proper, particularly during the period before the engine has reached operating temperature. Accordingly, under city driving conditions where the engine is repeatedly started in the cold condition and is seldom driven for a distance sufficient to reach the most efficient operating temperatures, the formation of partial oxidation products is particularly severe. Many of these partial oxidation products are carried down into the crankcase of the engine along with other blow-by gases, and since most are insoluble or only sparingly soluble in lubricating oils, they tend to separate from the oil and adhere to engine surfaces or form large droplets. In either case, under the elevated temperature conditions prevailing in the engine, these reactive monomers quickly polymerize to form solid masses which readily deposit out on the engine wall surfaces.

It is the practice in the art to prevent the formation of such deposits by adding to the lubricant a material normally referred to as a detergent. Insofar as is known, all the detergent additives which have heretofore been successfully employed on a commercial scale are organic, metal-containing compounds such as calcium petroleum sulfonate, calcium cetyl phosphate, calcium octyl salicylate, calcium phenyl stearate, the barium salt of wax-substituted benzene sulfonate, or the potassium salt of the reaction product of phosphorus pentasulfide and polybutene. Various of these detergents act by reacting chemically with deposit precursors to form harmless compounds. Others act to prevent flocculation or coagulation of solid particles in the oil and maintain the same in a state of suspension as finely divided particles. Still others not only perform this dispersant function but also effect the solubilization or emulsification of the sparingly soluble monomers in the oil and thereby greatly reduce the rate of polymerization. In the latter case, such polymer materials as do then form within the body of the oil are smaller in size and can be peptized or dispersed in the oil much more readily than is the case with the large polymeric particles which are formed on exposed engine surfaces or in droplets lying without the oil.

Detergents capable of acting in the latter fashion are preferably employed wherever possible particularly in automotive engines to be operated under city driving conditions. However, even among the metal-containing additives, few are available which are capable of solubilizing any appreciable amount of all the many types of polymer precursors which are carried into the oil from the fuel. Accordingly, it is a more particular object of this invention to provide a lubricant composition incorporating a metal-free detergent which is capable of solubilizing or emulsifying in the lubricant large amounts of all the various partial oxidation products of the fuel which are carried into the oil, and which is also capable of maintaining in suspension in the oil the various solid polymeric materials which are present therein.

The problem of piston ring and cylinder wall wear, especially the control thereof, is also one which is closely related to the composition of the crankcase lubricant. Aside from abrasive wear, which is caused by dust and dirt and can be remedied by suitable filtering and air-cleaning means, a large part of the wear experienced by piston rings and cylinder wall is attributable to chemical attack by moisture and acidic products originating as by-products of fuel combustion. In engines operated at optimum temperature levels, these combustion products are largely discharged through the exhaust and breather pipe. However, under the relatively "cold" conditions experienced in city driving, and especially at cylinder wall temperatures below about 150° F., the moisture and acid products are condensed on the engine surfaces where they promote corrosive attack and are in a position to work past the piston and accumulate within the engine and in the crankcase oil. This difficulty is one which the art has heretofore met most successfully by supplying the lubricating oil with additives such as the various metal salts of petroleum sulfonic acids and other metal-organic compounds, especially those having a basic reaction. However, this practice has a disadvantage of adding still another metal-containing ingredient to the oil and therefore of increasing the deposit-forming characteristics of the lubricant composition. Accordingly, it forms still another object of this invention to provide a lubricant composition containing a metal- or mineral-free additive which effectively decreases the wear experienced by piston rings and cylinder walls, particularly during periods before the engine has become thoroughly warmed to operating temperatures.

The present invention is based on the discovery that certain copolymers, which contain no metal component and therefore are substantially free of any ash-forming tendency, have the ability to impart excellent detergent and antiwear qualities to lubricating oils employed in internal combustion engines. In particular, these copolymers have the ability to solubilize in the oil large amounts of all the various partially oxidized combustion products of the fuels employed in internal combustion engines, while also having the ability of maintaining in a state of suspension any solid polymeric products present in the oil. Additionally, the copolymeric additives of the present invention effectively reduce the wear experienced by piston rings and cylinder wall surfaces even under the most unfavorable operating conditions such as are experienced during the starting and warming up of the engine. These additives have the advantage that they do not combine chemically with the various polymer precursors which are solubilized or dispersed in the oil, nor apparently do they act by neutralization reaction in counteracting the effect of the various acidic fuel combustion byproducts. Accordingly, they are capable of giving excellent protection against engine deposits and wear over extended operating periods. It should also be noted that the copolymeric additives of this invention are noncorrosive to the various bearing metals employed in engines.

Since the additives of the present invention differ in kind from any heretofore proposed for either detergent or antiwear purposes, it would have been surprising to discover that they were effective for either of these purposes. However, that they possessed not one but both of said qualities was altogether unexpected and could not have been predicted.

The polymeric additives of the present invention are copolymers of monomers selected from at least each of the first two classes of the classes consisting of (A) oil-solubilizing compounds having a polymerizable ethylenic linkage ($>C=C<$) and containing a hydrocarybl group of from 4 to 30 carbon atoms, (B) nitrogenous monomers selected from the group consisting of amides and amine salts of $\alpha,\beta$-unsaturated monocarboxylic acids of from 3 to 6 carbon atoms, and $\alpha,\beta$-unsaturated-$\alpha,\beta$-dicarboxylic acids of from 4 to 12 carbon atoms, wherein the nitrogen atom constituting the amide or amine salt linkage is attached to a hydrocarbon group having at least one hydrogen atom substituted by at least one polar group selected from the group consisting of hydroxyl and amino groups, and (C) acidic compounds selected from the group consisting of $\alpha,\beta$-unsaturated monocarboxylic acids of from 3 to 6 carbon atoms, $\alpha,\beta$-unsaturated-$\alpha,\beta$-dicarboxylic acids of from 4 to 12 carbon atoms, anhydrides thereof, and half-amides and monoamine salts thereof wherein the nitrogen atom constituting the amide or amine salt linkage is attached to a hydrocarbon group as defined in (B).

Representative copolymers coming within the scope of the present invention are, for example, those of allyl stearate, dilauryl maleate and lauryl N-(2-hydroxyethyl)-maleamate; dodecyl methacrylate, methacrylic acid, and heptadecenyl-2-hydroxyethyl imidazoline methacrylate (salt); and vinyl 2-ethylhexanoate, di(tetraethylene pentamine) itaconate and tetraethylene pentamine acid itaconate.

The oil-solubilizing monomer portion of the polymeric additives of this invention can be any compound having at least one ethylenic linkage ($>C=C<$), together with at least one substituent group which contains an oil-solubilizing hydrocarbyl group of from 4 to 30 aliphatic carbon atoms, and which is characterized by the ability to copolymerize through said ethylenic linkage with the polar monomer referred to above in the presence of a suitable catalyst. Alternatively, the oil-solubilizing aliphatic radical can be introduced into the copolymer, as will hereinafter be more fully described. This aliphatic radical, whether present in the original monomer or introduced into the copolymer, imparts oil solubility to the polymer and is preferably a branched or straight-chain alkyl radical or a cycloalkyl radical such as butyl, isobutyl, n-pentyl, n-hexyl, 2-ethylhexyl, decyl, dodecyl, tetradecyl, cyclohexyl, 4-ethylcyclohexyl, or the like, or an alkenyl radical such as oleyl, ricinoleyl, or the like, wherein the ethylenic double bond has substantially no copolymerizing tendency. Oil solubilizing monomers of this general character are well known in the art and are frequently employed as the oil-solubilizing portion of copolymers which are added to lubricating oils to improve the viscosity index and pour point characteristics thereof. They include such materials as olefins and ethylenically unsaturated ethers, esters, ketones, aldehydes, and the like.

The oil solubilizing monomers of component (A) may also be illustrated by the following general formula:

$$R_1(G')_{n'}CH=CH(G)_nR_2$$

in which $R_1$ and $R_2$ are members of the group consisting of hydrogen and hydrocarbon radicals of from 4 to 30 carbon atoms, at least one of which contains an aliphatic hydrocarbon group of from 4 to 30 carbon atoms as described above, G and G' are members of the class consisting of oxy (—O—), carbonyl

and carbonyloxy

or

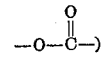

groups and combinations thereof with not more than two alkylene groups of from 1 to 7 carbon atoms each, and $n$ and $n'$ are 0 or 1. When $R_1$ and $R_2$ are hydrocarbon radicals, they may be alkyl, cycloalkyl, alkenyl, cycloalkenyl, aryl, alkaryl or aralkyl in structure, as illustrated by radicals such as 2-ethylhexyl, cyclohexyl, hexenyl, cyclohexenyl, phenyl, naphthyl, tertiary butylphenyl benzyl, etc., with the preferred radicals being as previously mentioned.

Representative oil-solubilizing monomer compounds which can be employed to form the copolymeric additives of the present invention include the following.

Olefins:
    Hexene-1
    2-ethylhexene-1
    Di- and triisobutylene
    Tripropylene
    Dodecene-1
    Hexadecene-1

Cyclohexene
Octadecene-1
4-octylcyclohexene-1
3-phenylhexadecene-1
p-Octylstyrene
Vinylcyclohexane
2-hexadecylbutadiene-1,3
p-Tertiarybutylstyrene Ethers:
  Vinyl n-butyl ether
  Vinyl 2-ethylhexyl ether
  Allyl n-butyl ether
  Allyl isobutyl ether
  Allyl cyclohexyl ether
  Allyl 4,4,8,8-tetramethyldocosyl ether
  Methallyl n-hexyl ether
  Methallyl n-decyl ether
  Methallyl 2-ethylhexyl ether
  Methallyl octadecyl ether
  Propenyl 2-ethylhexyl ether
  Crotyl n-octyl ether
  Isopropenyl dodecyl ether
  1-decenyl butyl ether
  1-eicosenyl decyl ether
  Vinyl p-octylphenyl ether
  Methallyl p-tert. butylphenyl ether
  1-decenyl p-cetylphenyl ether
  1-decenyl 2-phenylbutyl ether Esters:
  Vinyl caproate
  Vinyl palmitate
  Vinyl oleate
  Allyl caprylate
  Allyl laurate
  Allyl oleate
  Allyl palmitate
  Allyl stearate
  Allyl 2-ethylhexanoate
  Allyl ricinoleate
  Allyl esters of babassu acids
  Allyl esters of lard acids
  Allyl naphthenate
  Methallyl caproate
  Methallyl naphthenate
  Methallyl ricinoleate
  Methallyl p-octylbenzoate
  Methallyl oleate
  Methallyl cyclohexane carboxylate
  Methallyl palmitate
  Crotyl oleate
  Crotyl naphthenate
  α-Methylcrotyl palmitate
  1-propenyl naphthenate
  1-propenyl elaidate
  Dodecyl acrylate
  Hexadecyl methacrylate
  Isobutyl α-decylacrylate
  Vinyl p-n-octyl benzoate
  Allyl 3,5-diisobutyl benzoate
  Cyclohexyl methacrylate
  Cyclohexyl 2-dodecenoate
  Decyl vinylacetate
  Isooctyl α-chloroacrylate
  p-Isoamylphenyl 2-hexadecenoate
  4-p-tolylbutyl 2-octadecenoate
  Undecyl cinnamate
  Methylcyclohexyl 2-ethyl-2-hexenoate
  5-ethyldocosyl crotonate
  Octadecyl isocrotonate
  n-Butyl-2-eicosenoate
  p-Tert. amylphenyl octadecyl maleate
  p-Hexadecylphenyl 2-ethylhexyl maleate
  o-Tolyl 2-octadecylcyclohexyl maleate
  o-Nonylphenyl-hexadecyl maleate
  Dihexadecyl maleate
  Dimethylcyclohexyl maleate
  Mono-2-ethylhexyl maleate
  Di-2-ethylhexyl maleate
  Di-dodecyl maleate
  Di-dodecyl mesaconate
  Di-dodecyl citraconate
  o-Tolyl octadecyl itaconate
  Mono-hexadecyl itaconate
  Isopropenyl palmitoleate
  1-decenyl laurate
  1-hexadecenyl myristate Although any of the oil solubilizing compounds described above will give effective copolymer compositions for lubricant compositions in accordance with the present invention, higher alkyl esters of $\alpha,\beta$-unsaturated monocarboxylic acids of from 3 to 6 carbon atoms having alkyl groups of from 8 to 30 carbon atoms are most preferred, both for availability and effectiveness of copolymers prepared from them. Representative acids of this type are the acrylic, methacrylic, crotonic, tiglic, angelic, α-ethylacrylic, α-methylcrotonic, α-ethylcrotonic, β-ethylcrotonic, β-propylcrotonic, and hydrosorbic acids and the like. Even more desirable are the alkyl esters of acrylic and methacrylic acids containing from 10 to 20 carbons atoms in the alkyl groups, since they are found to provide highly superior polymers for the lubricant compositions of the invention and are obtainable in commercial quantities.

Various copolymers employing representative oil-solubilizing monomers of the foregoing types were prepared to illustrate the oil solubilizing effect of the monomers on the resultant copolymers. The solubility of the copolymers in oil and their suitability as lubricating oil additives were demonstrated by incorporating the copolymers into lubricating oils. The lubricant compositions thus obtained were tested to determine their detergency and deposition properties. The results of these tests are given in Table I below.

In the tests the base oil, unless otherwise indicated, is a solvent-refined, wax-free, SAE-30 grade mineral lubricating oil having a viscosity index of 85 which is derived from California waxy crude. Various amounts of the copolymers are incorporated into the oil as indicated in terms of percent by weight.

The piston varnish ratings of the lubricant compositions were obtained by the standard FL-2 test procedure as set out in the June 21, 1948, report of the Coordinating Research Council. In this test the lubricating oil compositions were tested as crankcase lubricants in a 6-cylinder Chevrolet engine, using a low-grade gasoline especially prone to cause engine deposits. At the end of each test the engine was dismantled and the detergency or deposition properties of the lubricant compositions were determined by examining the engine deposits on the piston and visually rating them as to the amount of piston varnish present. The piston varnish ratings of the compositions are given in numerical terms on a scale of 0–10 with "10" representing the complete absence of deposits.

The deposition characteristics of the lubricant compositions containing the copolymeric additives were also determined in the lacquer deposition test. In this test typical engine fuel combustion products were passed into the lubricant compositions and the ability of the lubricant compositions to solubilize and retain the lacquer-forming materials was observed by weighing the amount of lacquer deposits formed on a fresh iron catalytic surface for a standard period of time. The lacquer deposit of the lubricant composition is taken as the number of milligrams deposit on the metal surface, and may be correlated directly to the piston varnish rating obtained in the standard FL-2 test procedure outlined in the above paragraph.

Both the FL-2 test procedure and the lacquer deposition test are more fully described in the disclosure which follows with regard to the particular lubricant composition of the present invention.

TABLE I

| Lubricant composition | Ratio of (1) Monomer to (2) monomer to (3) monomer | Piston varnish rating | Lacquer deposit (milligrams) | Piston varnish ratings (estimated from lacquer deposit) |
|---|---|---|---|---|
| Base oil alone | | 3.0 | 850 | |
| 2.8% (1) dodecyl methacrylate, (2) N,N'-di-2-hydroxy-ethyl maleamide | 20/1 | | 450 | 5.0 |
| 2.8% (1) dodecyl methacrylate, (2) allyl stearate, (3) maleic anhydride | 20/1/1 | | 405 | 5.2 |
| 1.5% (1) dodecyl methacrylate, (2) N-(2-hydroxyethyl) methacrylamide | 7/1 | 6.3 | | |
| 3.0% (1) tridecyl methacrylate, (2) octadecyl methacrylate (3) monododecyl ether of hexadecaethylene glycol [1] methacrylate [2] | 10/6/1 | 8.4 | | |
| 2.5% (1) allyl stearate (2) didodecyl maleate (3) di-(hydroxyethyl)ethylene-diamine salt of monododecyl maleate | 5/5/2 | 5.5 | | |
| 2.8% (1) vinyl ethylhexoate, (2) itaconic acid | 15/1 | | 500 | 4.5 |
| 2.8% (1) vinyl stearate (2), maleic anhydride, (3) monododecyl ether of pentaethylene glycol [3] methacrylate, (4) methacrylamide | 30/1/2/1 | | 325 | 6.0 |
| 2.5% (1) allyl stearate, (2) ethylene glycol monooleate monomaleate, (3) mono - N,N' - di(2-hydroxy-ethyl) ethylenediamine maleate (salt) | 5/4/1 | 4.0 | | |
| 2.8% (1) octadecene (2) monododecyl maleate, (3) monopentaerythritol maleate | 2/1/1 | | 500 | 4.5 |
| 2.8% (1) hexene-1, (2) Dodecyl methacrylate, (3) methacrylic acid (4) monododecyl ether of eicosa-ethylene glycol [4] methacrylate | 25/25/1/4 | | 400 | 5.5 |
| 2.8% (1) di-2-ethylhexyl fumarate, (2) octadecene-1, (3) crotonic acid, (4) monotridecyl ether of decaethylene glycol [5] methacrylate | 25/25/8/2 | | 570 | 4.0 |
| 2.8% (1) allyl ethyl ether, (2) vinyl stearate, (3) itaconic acid, (4) monododecyl ether of decaethylene glycol [5] crotonate | 14/50/7/3 | | | |
| 3.0% (1) vinyl 2-ethylhexyl ether, (2) tetradecylphenyl maleate, (3) dodecyl maleate, (4) maleic acid | 6/3/1/2 | 4.6 | | |
| 1.5% (1) dodecyl acrylate, (2) monododecyl ether of deca-ethylene glycol [5] acrylate, (3) acrylic acid | 780/9/1 | 5.6 | | |
| 1.5% (1) hexadecyl styrene, (2) methacrylic acid | 5.8/1 | 5.9 | | |

[1] Polyethylene glycol of 704 M.W.
[2] In 140 Neutral Mineral Lubricating Oil from solvent-refined waxy California crude.
[3] Polyethylene glycol of 220 M.W.
[4] Polyethylene glycol of 880 M.W.
[5] Polyethylene glycol of 440 M.W.

From the above test data it will be seen that all of the various oil-solubilizing monomers representative of the aforementioned types were effective in the production of useful, copolymeric lubricating oil additives which are capable of preventing deposits from lubricant compositions under typical engine operating conditions. These monomers, as previously described, constitute a definite, recognized class of compounds which have been used heretofore in the art in the production of polymeric lubricating oil additives of the nonpolar type, such as VI improvers and pour point depressants. Although the results demonstrate beyond any reasonable doubt the suitability of the different oil-solubilizing monomers within the terms of the description in the production of oil soluble copolymers, it should be understood that the efficacy of each individual class of copolymers as detergents is primarily dependent upon the particular polar or functional group in the so-called polar monomer and its relationship to the rest of the copolymer.

Since the functionality of the individual polar groups differs and is largely empirical in nature, no conclusion is intended to be drawn concerning equivalency of the various copolymeric lubricating oil additives employed as detergents in this illustration. The polar groups of the particular class of copolymers of the compositions of this invention and their balance or relationship to the remainder of the copolymers are more fully discussed in the disclosure which follows, along with additional examples of the invention.

Suitable monomeric nitrogenous components of the polymeric additives of the present invention are the amides and amine salts of α,β-unsaturated monocarboxylic acids of from 3 to 6 carbon atoms (e.g. methacrylic, acrylic, crotonic, tiglic, and like acids) wherein the nitrogen atom of the amide or amine salt is linked to at least one hydrocarbon radical which is substituted by one or more hydroxy or amino polar groups.

A preferred group of such nitrogenous monomers is one of the type having the general formula

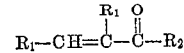

wherein the $R_1$'s are hydrogen atoms or methyl groups, and $R_2$ is a radical having the structure

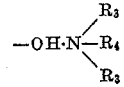

(in the case of amine salts), or

(in the case of amides), where the $R_3$'s represent hydrogen atoms or monovalent hydrocarbon or polar group substituted hydrocarbon radicals, and the $R_4$'s represent hydrocarbon radicals which are substituted by one or more amino (including —$NH_2$ and —$NHR_5$ groups, where $R_5$ is a hydrocarbon radical, preferably lower alkyl, i.e., less than 8 carbon atoms) and hydroxy polar groups. Preferably the amide or amine salt is one of methacrylic acid wherein the $R_3$'s are hydrogen atoms, lower alkyl, or polar-substituted lower alkyl groups, and $R_4$ is a hydroxy- or amino-substituted hydrocarbon radical wherein the polar groups are attached to aliphatic carbon atoms. More preferably, $R_4$ is a lower ($C_1$–$C_7$) straight- or branched-chain alkyl or cycloalkyl radical which is substituted by one or more of the aforesaid polar groups.

Representative nitrogenous monomer components of the copolymers employed in this invention include:

Ethanolamine salt of methacrylic acid
Diethanolamine salt of methacrylic acid
Diethylenetriamine salt of methacrylic acid
Tetraethylenepentamine salt of methacrylic acid
Dihydroxyethyl ethylenediamine salt of methacrylic acid
Triethanolamine salt of methacrylic acid
2,5-dimethylpiperazine salt of methacrylic acid
p-Hydroxyaniline salt of methacrylic acid
N-(2-hydroxyethyl)-methacrylamide N-(2-aminoethyl)-methacrylamide
N-(4-aminobutyl)-methacrylamide
N-(4-aminohexyl)-methacrylamide
N-(3-azapentyl)-methacrylamide
N-(2,3-dihydroxypropyl)-methacrylamide
N-(4-hydroxycyclohexyl)-methacrylamide
N-(2-ethyl-6-aminohexyl)-methacrylamide
N-(p-aminophenyl)-methacrylamide
N-(p-hydroxyphenyl)-methacrylamide
N-ethyl-N-(2-hydroxyethyl)-methacrylamide
N,N-di(2-hydroxyethyl)-methacrylamide
N-(2-hydroxyethyl)-N-aminomethyl-methacrylamide
N-(2-hydroxy-6-phenylhexyl)-methacrylamide
N-(2-hydroxyethyl) - N - (3-aza-5-hydroxypentyl)-methacrylamide
The methacrylic acid amide of 2-hydroxyethyl p-aminobenzoate
The methacrylic acid amide of pentaerythritol mono-p-aminobenzoate
The methacrylic acid amide of 2-hydroxyethyl 3-aminopropionate
Ethanolamine salt of acrylic acid
Diethanolamine salt of acrylic acid
Triethanolamine salt of acrylic acid
Tetraethylenepentamine salt of acrylic acid
Dihydroxyethyl ethylenediamine salt of acrylic acid
N-(2-hydroxyethyl)-acrylamide
N-(2-ethyl-6-hydroxyhexyl)-acrylamide
N-(3-azapentyl)-acrylamide
N,N-di-(2-hydroxyethyl)-acrylamide
N-(3-hydroxypropyl)-N-(6-aminohexyl)-acrylamide
N-p-hydroxyphenyl-acrylamide
N-(4-aminocyclohexyl)-acrylamide
N-butyl-N-(2-hydroxyethyl)-acrylamide
N-(2-hydroxyethyl)-N-(3-aza - 5 - hydroxypentyl)-acrylamide
N-(2,4,6-triaza-7-aminoheptyl)-acrylamide
Ethanolamine salt of crotonic acid
Tetraethylenepentamine salt of crotonic acid
N-(2-hydroxyethyl)-crotonamide
N-(4-aminobutyl)-crotonamide
N-(2-hydroxyethyl)-N-(3-aza-5-hydroxypentyl) - crotonamide
Ethanolamine salt of tiglic acid
N-(4-aminobutyl)-tiglamide
Dihydroxyethyl ethylenediamine salt of tiglic acid Other suitable nitrogenous monomer components of the copolymeric additives of this invention are the derivatives of aliphatic, α,β-unsaturated, dicarboxylic acids of from 4 to 12 carbon atoms (e.g., maleic, fumaric, citraconic, mesaconic, α-hydromuconic, and like acids) wherein at least one of the carbonyl carbon atoms of the acid is linked (either as an amide or as an amine salt) to the nitrogen atom of an amine wherein the nitrogen atom, in turn, is linked to at least one hydrocarbon radical which is substituted by one or more hydroxy or amino polar groups. The term "amino polar group," as employed herein, includes both —NH$_2$ as well as —NHR groups, R being a monovalent polar group-substituted hydrocarbon radical. The remaining carboxyl groups, if any, in the acid monomer which are not amide- or amine salt-linked to a polar-substituted amine of the type described above can be left as free carboxyl groups or converted to one or more of various cyano, ester or amido linkages.

A preferred group of such nitrogenous monomers is made up of those of the type defined in the foregoing paragraph, but where the dicarboxylic acid is one of the α,β-unsaturated, α,β-dicarboxylic variety, e.g., maleic acid, fumaric acid, citraconic acid, or the like. A still more preferred group is made up of nitrogenous monomers of the type having the structural formula

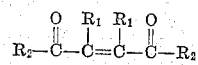

where the $R_1$'s which can be the same as or different from one another, are hydrogen atoms or alkyl groups of not more than 8 carbon atoms, and wherein at least one of the $R_2$'s is a radical having the structure —OH·$NR_3R_3R_4$ (in the case of amine salts) or —$NR_3R_4$ (in the case of amides), the $R_3$'s in said formulae being hydrogen atoms or hydrocarbon or substituted hydrocarbon (preferably alkyl or polar substituted alkyl) radicals and the $R_4$'s being hydrocarbon radicals (preferably lower alkyl in character) which are substituted by at least one hydroxy or amino (including —NH$_2$ and —NHR groups) polar group, and where any remaining $R_2$ is an —OH, —NH$_2$, —NHR, or —OR group, R being an hydrocarbon radical, and preferably an alkyl radical.

Representative nitrogenous monomer components of the above type, any one or more of which can be used in the copolymeric oil additives of this invention, are:

N,N'-di-(2-hydroxyethyl)-maleamide
N-(3-aminopropyl)-maleamic acid
Monoethanolamine salt of maleic acid
Lauryl N-(2-hydroxyethyl)-maleamate
Diethanolamine salt of N-(2-hydroxyethyl)-N-(3-aza-5-hydroxypentyl)-maleamic acid
Tetraethylene pentamine salt of monolauryl maleate
Dihydroxyethyl ethylenediamine salt of maleic acid
Dodecyl N-(p-aminophenyl)-maleamate
N-ethyl-N-(2-hydroxyethyl)-N'-phenyl-maleamide
N-(2-hydroxyethyl)-fumaramic acid
N,N'-di-(2-hydroxyethyl)-fumaramide
N-(2,3-dihydroxypropyl)-N'-(2-aminoethyl)-fumaramide
Erythritol N-(2-hydroxyethyl)-monofumaramate
N,N'-di-(2-hydroxy-4-aminohexyl)-citraconamide
Dodecyl N(2-hydroxyethyl)-citraconamate
N-butyl-N'(4-hydroxycyclohexyl)-citraconamide
N,N-di-(2-hydroxyethyl)-citraconamic acid
Di-tetraethylene pentamine salt of glutaconic acid
γ-Carbamyl-N-(2-hydroxyethyl)-crotonamide
N,N'-di(2-hydroxyethyl)-α-hydromuconamide The acidic compounds or component (C) of the copolymer may be any of the mono- and dicarboxylic acids of the type described above, including anhydrides, half amides, and monoamine salts of the latter, wherein the amide and amine salts are as defined in connection with the (B) monomers of the foregoing description.

In preparing the copolymers of this invention, it is only necessary that conditions be chosen which will insure copolymerization and the formation of copolymers having the requisite oil solubility. The oil-solubilizing (A) monomers vary somewhat in their solubilizing characteristics. Thus, in some cases it is possible to obtain copolymers which are soluble in oil by employing oil solubilizing nitrogenous (A) and (B) monomer ratios as low as 1:1; while in others it is advantageous to raise this ratio to much higher values, e.g., about 20:1, in order to obtain a copolymer product having optimum oil solubility characteristics. As a general rule, however, copolymers having excellent detergent and anti-wear characteristics, together with the requisite oil solubility (which should be at least 2% and is preferably greater than 10% by weight of the lubricant composition) can be prepared by employing oil-solubilizing (A) monomer to polar (B) monomer ratios of from about 3:1 to 15:1, and such a range is preferably employed wherever possible.

The copolymers of this invention can be prepared by one or more of a variety of different methods known in the art. As regards the reactants per se, there can be employed a given oil-solubilizing monomer, or a mixture of such monomers, together with a nitrogen monomer or a combination of such monomers. However, it is also possible to employ monomer reactants other than those which finally compose the copolymer. Thus, in the case where ester monomers are to form a part of the copolymer, one may employ, instead of the ester, the corresponding unsaturated alcohol or unsaturated acid, with the balance of the ester monomer unit being supplied by subjecting the copolymer intermediate to an appropriate esterification treatment. Again, instead of employing the monomeric amide or amine salt to form the copolymer, one can employ the corresponding unsaturated acid or acid anhydride, or the acid chloride, or a half ester of the acid, for example, with the desired amide or amine salt then being formed after the polymerization reaction is complete. Thus, a copolymer of dodecyl methacrylate and N,N'-di-(2-hydroxyethyl)-maleamide can be formed by first copolymerizing equimolar amounts of dodecyl methacrylate and maleic anhydride, and then forming the desired amide linkages by treating the copolymer with ethanolamine under appropriate conditions. Again, by a practice of this same method, but using only a minor percentage of the amount of ethanolamine required for complete amidization, there is formed a copolymer made up of at least three different monomer units, namely, dodecyl methacrylate, maleic anhydride, and N-(2-hydroxyethyl)-maleamic acid. As the remaining carboxyl or incipient carboxyl (anhydride) groups in the latter copolymer are then converted to one or more of various ester, cyano, or amide linkages, or the like, it is obvious that many other monomer units can readily be formed in the copolymer.

In another example, assuming that the copolymer is to be formed from related monomers, as from an alkyl methacrylate and methacrylamide, one may first homopolymerize the ester, then effect partial hydrolysis of the homopolymer, and finally convert the liberated carboxyl group to the desired substituted amide or amine salt form. In any event, however, the present invention contemplates the formation of only those copolymers which are soluble to the extent of at least 2% by weight in hydrocarbon mineral oils, and which contain at least one polar-substituted amide or amine salt monomer unit for each twenty oil-solubilizing monomer units present in the copolymer, and at most one such nitrogenous monomer unit for each monomer unit of the oil-solubilizing compound.

Having selected the desired monomeric reactants, the copolymer of this invention can be prepared by conventional bulk, solution or emulsion methods of addition polymerization in the presence of an addition polymerization initiator. Preferably, however the copolymerization is effected in an inert organic solvent such as benzene, toluene, xylene or petroleum naphtha in the presence of a free radical-liberting type of initiator such as a peroxy compound, for example, benzoyl peroxide, acetyl peroxide, tert.-butyl hydroperoxide, di-tert. butyl peroxide, dibenzoyl peroxide, or di-tert. amyl peroxide, or an azo initiator such as 1,1'-azodicyclohexanecarbonitrile, or α,α'-azodiisobutyronitrile. The catalyst or polymerization initiator, can be employed in an amount of from about 0.1 to 10%, with a preferred range being from about 0.25 to 2%. If desired, the catalyst can be added in increments as the reaction proceeds. Likewise, additional portions of the solvent can also be added from time to time in order to maintain the solution in a homogenous condition. The temperature of copolymerization varies from about 75 to 150° C., with the optimum temperature depending on the solvent selected, the concentration of monomers present therein, the catalyst selected, and the time of the reaction. Much the same conditions prevail when the copolymerization is effected in bulk rather than in the presence of an inert solvent. The copolymer additives of the invention have apparent molecular weights as determined by standard light scattering methods of at least 2,000 and preferably at least 8,000. For practical purposes, molecular weights of from 100,000 to 1,000,000 are most suitable from the standpoint of viscosity and other physical characteristics of the polymeric additives.

In a preferred application of the copolymeric lubricating oil detergent additives of the present invention in mineral lubricating oil, it has been noted that a certain optimum relationship between the total number of aliphatic carbon atoms to polar groups within the molecule appears to exist. Evidence has been obtained that for a given concentration the copolymer compositions containing a ratio of aliphatic carbon atoms to polar groups within the range of from 50 to 225, preferably 75 to 125, appear to embrace the optimum composition for deposit reduction effectiveness. In determining this apparent balance between the polar and nonpolar constituents, the aliphatic carbon atoms to be considered are the following: $CH_3-$, $-CH_2-$,

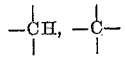

and excluding aromatic ring carbon atoms or the carbon atom of the cabonyl groups. As polar groups, the following representative radicals are included: $-OH$ (either acid, alcohol or phenol), $-NH_2$, $-NH$, $-N-$, and an acid anhydride group as a single unit.

Although this concept of copolymer compositions appears to correlate generally with their performance in all of the oils of lubricating viscosity, there may be additional composition factors which alter the effect of these improving agents in various types of lubricating oil systems and service. However, on the basis of these assumptions, it becomes evident that variations in the aliphatic carbon to polar ratio and hence performance efficacy may be accomplished by the choice of the acid derivative radical and degree of neutralization in the modification of polar component (B).

Typical methods for preparing the copolymers which can be employed with success as detergents and anti-wear oxidants in lubricant compositions are given in the following examples:

*Example I*

This example illustrates the preparation of a dodecyl methacrylate/N - 2 - hydroxyethyl-methacrylamide copolymer from dodecyl methacrylate homopolymer having an apparent molecular weight of approximately 20,000. In this case it was desired to saponify approximately 15% of the ester groups in the homopolymer and to thereafter form the amide from the saponified material. Accordingly, a solution of 14 grams of potassium hydroxide in 300 cc. of 2-ethylhexanol was prepared, and to this solution was added 800 cc. of a 40% solution of the polydodecyl methacrylate in mineral oil, this amount of potassium hydroxide constituting a slight excess over that theoretically required to effect the desired saponification. The resulting solution was heated to 320° F. and maintained at this temperature, with stirring, for a period of 10 hours. To this solution was then added a 50% excess of 6 N-hydrochloric acid over the amount theoretically required to liberate the free acid, along with 500 cc. of benzene. This solution was then refluxed for 8 hours, after which it was cooled and diluted with ethyl ether. This solution was then water washed until the aqueous layer was no longer acid to litmus, ethyl alcohol being added with each water wash to break the emulsion. The solution was then placed on a steam plate to remove the ether and was then distilled in vacuo to remove the 2-ethylhexanol and the lauryl alcohol until a pot temperature of 350° F. at 3 mm./Hg was reached. To the resulting liquid was then added the amount of ethanolamine theoretically required to form the amide, along with an amount of about 50% by weight of a xylene-toluene solvent. The amide was then formed by distilling the solvent from the solution until no further amount of water appeared in the azeotrope.

*Example II*

This operation was conducted under the same conditions and with the same reactants as described in Example I, above. Here, however, instead of adding ethanolamine to the hydrolysis product, there was added an amount of dihydroxyethyl ethylene diamine

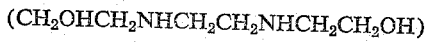
(CH₂OHCH₂NHCH₂CH₂NHCH₂CH₂OH)

theoretically required to convert the free carboxyl groups present to the corresponding amine salt. The resulting solution was then heated at 180° F. for 3 hours to complete the reaction. In another operation, wherein the dihydroxyethyl ethylenediamine was added along with a mixed xylene-toluene solvent and the solution then distilled in the fashion described in Example I, there was formed dodecyl methacrylate/N-(2-hydroxyethyl)-N-(3-aza-5-hydroxypentyl) methacrylamide copolymer.

*Example III*

In the operation 7 moles of dodecyl methacrylate and 1 mole of N-(2-hydroxyethyl)-methacrylamide were dissolved in benzene. To the resulting solution was then added 0.25% of benzoyl peroxide, based on the weight of the reactants, after which the solution was refluxed for 5 hours to form the copolymer. Part of the benzene was then evaporated off and the concentrated solution was poured into 5 times its volume of acetone. The resulting mixture was first agitated and then allowed to settle into two layers. The unreacted monomers present, as well as any homopolymers formed during the reaction are removed with the acetone layer, while the desired copolymer remains in solution in the benzene layer. The oil-soluble copolymer can then be recovered (after one or more intermediate washings with acetone, if desired) by evaporating off the benzene.

*Example IV*

In this operation, an oil-soluble copolymer was prepared which contained allyl stearate and dilauryl maleate oil-solubilizing monomer units, together with lauryl N-(2-hydroxyethyl)-maleamate. This copolymer was prepared by first copolymerizing equimolar quantities of allyl stearate and maleic anhydride at about 250° F. in the presence of benzoyl peroxide, a solution of the latter in toluene being slowly added over a heating period of about 6 hours until approximately 2% of the peroxide, based on the weight of the monomer reactants, had been added. After stripping out the toluene and the catalyst decomposition products in vacuo, the copolymer was dissolved in xylene along with 0.15% (based on the weight of the polymer) of toluene sulfonic acid, and to this solution was added the amount of lauryl alcohol theoretically required to esterify approximately 81.5% of the total available acid (still present as the anhydride) in the copolymer. Esterification was then effected by refluxing the solution at about 320-360° F. for 4 hours. This copolymer intermediate was then admixed with the amount of ethanolamine theoretically required to convert the remaining free carboxyl groups to amide units, together with an amount of about 50% by weight of xylene-toluene solvent. The amide was then formed by heating the reaction mixture and distilling the solvent from the solution until no further traces of water appeared in the azeotrope, after which the remaining solvent was stripped off in vacuo. There remained the desired copolymer material in the form of an oil-soluble semi-gel wherein the respective allyl stearate, dilauryl maleate and lauryl N-(2-hydroxyethyl)-maleamate monomer units were present in the approximate proportion of 5:3:2. The copolymer had an apparent molecular weight of approximately 200,000.

*Example V*

This operation was conducted in essentially the same manner as described above in Example IV. Here, however, the esterification effected with lauryl alcohol was increased from 81.5 to 85%, and in lieu of reacting the ester copolymer intermediate with ethanolamine to form the corresponding amide, the ester copolymer was reacted with the amount of dihydroxyethyl ethylenediamine theoretically required to convert the remaining free carboxyl groups to the corresponding amine salt. In this case the salt was formed by heating the reaction mixture to a temperature of 200° F. for a period of about one hour, the desired copolymer being recovered as an oil-soluble material having an apparent molecular weight of about 265,000. In the copolymer of this example, the respective monomer units of allyl stearate, dilauryl maleate and the dihydroxyethyl ethylenediamine salt of monolauryl maleate were present in the approximate ratio of about 5:5:2.

*Example VI*

389 g. (1.53 moles) of dodecyl methacrylate, 7.5 g. (0.076 mole) of maleic anhydride, and 10 cc. of benzene were charged to a three-necked flask fitted with a stirrer, thermometer, reflux condenser, and dropping funnel. The mixture was heated to 220–225° F. with stirring. A solution of 3 g. of benzoyl peroxide and 3 g. of tert-tiarybutyl hydroperoxide in 60 cc. of benzene was then added over a period of 6 hours after which time the mixture was kept at 205° F. for approximately 18 hours. The product was stripped to 370° F. at 1 mm. mercury pressure to give 375 g. of a viscous oil-soluble polymer shown by analyses to contain dodecyl methacrylate and maleic anhydride in a molar ratio of approximately 20:1.

A mixture of 87 g. of dodecyl methacrylate-maleic anhydride copolymer, 6 g. (0.098 mole) of ethanolamine (a two-fold excess of amine to amidify the total available free acid), 0.17 g. p-toluene sulfonic acid monohydrate, and xylene were heated to 320° F. for 11 hours in the reaction flask previously described. At this point the solvent and excess ethanolamine were stripped off by a distillation at 380° F. under a vacuum equal to a pressure of about 1 mm. of mercury. Analysis of the product thus obtained indicated approximately 74% amidification of the total free acid available.

*Example VII*

A maleic anhydride-dodecyl methacrylate-allyl stearate copolymer was synthesized by mixing 190 g. (0.75 mole) of dodecyl methacrylate, 5 g. (0.05 mole) of maleic anhydride, and 16.2 g. (0.05 mole) of allyl stearate in a three-necked reaction flask fitted with a stirrer, condenser, and thermometer in accordance with the procedure of Example VI. The mixture was heated to 220° F. and 2 g. of tertiary butyl peroxide was added over a period of 2 hours. During this time the temperature was maintained at 220 to 230° F. by either heating or cooling as required. Following the addition of the catalyst, the mixture was held at 215° F. for about 18 hours and then stripped to 380° F. at 1 mm. mercury pressure to yield 200 g. of a viscous, oil-soluble polymer shown by analysis to contain dodecyl methacrylate, allyl stearate, and maleic anhydride in a molar ratio of approximately 15:1:1.

A mixture of 150 g. of the maleic anhydridedodecyl methacrylate-allyl stearate copolymer, prepared above, 6 g. (0.057 mole) of diethanolamine (theory amine for 100% amidification of available free acid), 0.2 g. p-toluene sulfonic acid monohydrate catalyst, and xylene were charged to the reaction flask described previously. The contents of the flask were refluxed for about 4 hours at 300° F. while stirring. At this point 12 g. (0.114 mole) of diethanolamine were added along with 0.2 g. of catalyst. The mixture was maintained at 300° F. for another 3½ hours. One and one-half liters of a benzene-xylene mixture (50:50) were added to the mixture. The solution was filtered, concentrated to about 500 cc., and the polymer was precipitated with 4 volumes of methanol. Analyses of the recovered polymer indicated 100% amidification of the available free acid.

Example VIII 425 g. (2.5 moles) of vinyl 2-ethylhexanoate, 21.7 (0.167 mole) of itaconic acid, and 60 cc. of butanone were charged to a three-necked flask fitted with a stirrer, thermometer, reflux condenser, and dropping funnel. The mixture was heated to 220 to 225° F. with stirring. A solution of 8.9 g. of benzoyl peroxide in 90 cc. of butanone was added dropwise over a period of 7 hours during which time the temperature was maintained between 220° F. and 230° F. by heating or cooling as required. Another 2.2 g. of catalyst in 25 cc. of butanone were added, the mixture was thoroughly stirred and then let stand for approximately 18 hours at 190° F.

Approximately 400 cc. of benzene were added to one-fifth of the reaction mixture and the polymer was precipitated with 5 volumes of methanol. The isolated polymer was shown by analysis to contain vinyl 2-ethylhexanoate and itaconic acid in a molar ratio of approximately 22:1.

A mixture of 30.0 g. of the vinyl 2-ethylhexanoate-itaconic acid copolymer as a concentrate in lubricating oil, and 1.8 g. (0.0095 mole) of tetraethylene pentamine was heated at 195° F. for 2 hours. The polymer derivative was shown by analysis to contain sufficient amine to form the ammonium salt of 60% of the available acid.

Example IX 150 g. (0.507 mole) of mixed alkyl methacrylates (average molecular weight about 296), consisting of 60% tridecyl methacrylate and 40% octadecyl methacrylate, and 7.2 g. (0.042 mole) of N,N-dimethylaminopropylmethacrylamide were charged to a three-necked flask fitted with a stirrer, thermometer and reflux condenser. The mixture was heated to 220 to 225° F. with stirring. Bulk benzoyl peroxide was added in small installments over a 6-hour period. The mixture was then kept at 190° F. for an additional 18 hours. The product was twice precipitated from a 20% by weight benzene solution with 4 volumes of methanol. The isolated polymer was shown by analyses to contain tridecyl methacylate, octadecyl methacrylate and N,N-dimethylaminopropylmethacrylamide in a molar ratio of 9:6:1.

Example X 139 g. of allyl stearate and maleic anyhdride copolymer in 1:1 ratio was mixed with 176 g. ethylene glycol monooleate in 200 cc. of xylene. 0.2 g. of p-toluene sulfonic acid was added as a catalyst. The mixture was refluxed for 20 hours during which water was removed and 81.5% of the total carboxyl groups available were esterified. The xylene was then distilled off. 18.1 g. N,N-di-2-hydroxyethyl ethylene diamine were added and the mixture was stirred at 190 to 220° F. for 4 hours to form the salt of the remaining carboxylic acid groups.

Example XI 265 g. of dodecyl methacrylate and methacrylic acid copolymer in 7:1 molar ratio and analyzing 0.07 mole of acid in the form of a 40% concentrate in mineral lubricating oil was mixed with 7.65 g. (0.073 mole) of N-aminoethyl ethanolamine. The mixture was stirred at 175 to 180° F. for about 5 hours to give the copolymer of (1) dodecyl methacrylate and (2) 2-aminoethyl-2-hydroxyethyl amine methacrylate (salt) in 7:1 molar ratio in the form of a 40% concentrate in the mineral lubricating oil.

Example XII 265 g. of dodecyl methacrylate and methacrylic acid copolymer (as described above) was mixed with 11.8 g. (0.035 mole) of heptadecenyl-2-hydroxyethyl imidazoline at 200° F. for 3 hours to give the copolymer of (1) dodecyl methacrylate, (2 methacrylic acid, and (3) heptadecenyl-2-hydroxyethyl imidazoline methacrylate (salt) in a 14:1:1 ratio as a 40% concentrate in mineral lubricating oil.

In general, excellent detergent and anti-wear properties can be imparted to lubricating oils by dissolving therein a quantity of from about 0.1 to 10% by weight of the copolymers of the type described above, although a preferred range is from about 0.5 to 5% by weight. The copolymeric additives of this invention can be used with good effect in the case of any one of a wide variety of oils of lubricating viscosity, or of blends of such oils. Thus, the base oil can be a refined Pennsylvania or other paraffin base oil, a refined naphthenic base oil, or a synthetic hydrocarbon or non-hydrocarbon oil of lubricating viscosity. As synthetic oils there can be mentioned alkylated waxes and similar alkylated hydrocarbons of relatively high molecular weight, hydrogenated polymers of hydrocarbons, and the condensation products of chlorinated alkyl hydrocarbons with aromatic compounds. Other suitable oils are those which are obtained by polymerization of lower molecular weight alkylene oxides such as propylene and/or ethylene oxide. Still other synthetic oils are obtained by etherification and/or esterification of the hydroxy groups in alkylene oxide polymers such as, for example, the acetate of the 2-ethylhexanol-initiated polymer of propylene oxide. Other important classes of synthetic oils include the various esters as, for example, di(2-ethylhexyl) sebacate, tricresyl phosphate and silicate esters. If desired, the oil can be a mixture of mineral and synthetic oils.

While satisfactory lubricant compositions can be obtained by adding to the base oil employed only one or more of the copolymeric additives of the type described above, it also falls within the purview of this invention to provide lubricant compositions which contain not only such copolymers, but also other additives such as pour point depressants, oiliness and extreme pressure agents, antioxidants, corrosion inhibiting agents, blooming agents, thickening agents, and/or compounds for enhancing the temperature-viscosity characteristics of the oil. The present invention also contemplates the addition to the lubricant composition (particularly when the amount of copolymer employed is relatively small) of auxiliary detergents and/or antiwear agents.

The efficacy of copolymeric additives of the type described above as detergents and antiwear agents in lubricating oils is illustrated by data from a number of tests. In the tests from which the data is obtained the base oil, unless otherwise specified, is a solvent-refined, wax-free SAE-30 grade mineral lubricating oil having a viscosity index of 85 which is derived from California waxy crude. Various amounts of the copolymeric additives are incorporated into the oil as noted in terms of percent by weight.

In the lacquer deposition test the low temperature detergency of the oils tested is measured by determining the ability of the oil to solubilize and retain typical engine fuel deposits and precursors thereof which are formed due to incomplete combustion of the fuel. Retention of these deposits in a given oil depends upon their dispersal and upon minimizing their polymerization to lacquer.

Briefly described, the lacquer deposition test involves condensing fresh cool flame oxidation products from a standard test fuel simulating the fuel combustion products of an internal combustion engine in a steel vessel containing a certain amount of the lubricating oil being tested. The steel surface of the vessel acts as an iron catalyst for polymerization of the fuel oxidation products to lacquer in the same manner as the steel surfaces in an internal combustion engine. After the oxidation products have been condensed, the steel vessel containing the lubricating oil is heated for 24 hours at a temperature selected to correspond with actual engine conditions. The test oil is then decanted while hot from the lacquer deposits formed in the steel vessel due to polymerization and the lacquer deposits are de-oiled and weighed.

In the actual test a low grade gasoline is employed of the type described in connection with the standard FL-2 test procedure given below. The gasoline at a rate of 13.3 cc. per hour is vaporized and mixed with air, the air rate being 1.75 liters per minute. The vapor mixture of gasoline and air is then fed into an elongated cool flame combustion chamber of standard design having a diameter of 1½ inches. The cool flame combustion chamber is maintained at 695° F. The test is continued for 1 hour dur-during which the oxidation products issuing from the cool flame combustion chamber are condensed into the weighed steel catalyst vessel which contains 30 g. of the oil being tested at about room temperature. The steel vessel containing test oil and condensed oxidation products is then heated for 24 hours at 110° F. The oil is decanted from the lacquer deposits in the vessel, following which the deposits are de-oiled by washing with petroleum solvent. The increase in weight of the steel vessel due to the lacquer deposits is then determined and recorded in milligrams as "LD" or "lacquer deposit."

The lacquer deposit for any given lubricant composition obtained in accordance with the procedure described above is directly correlated to the "piston varnish rating" or "PVR" obtained for the same lubricant composition in the standard FL-2 test procedure previously referred to and hereinafter more particularly described. Table II which follows gives the correlated values for both the Lacquer Deposits and Piston Varnish Ratings.

TABLE II

| LD | PVR | LD | PVR |
|---|---|---|---|
| 140 | 9.5 | 335 | 6.0 |
| 170 | 9.0 | 370 | 5.5 |
| 190 | 8.5 | 420 | 5.0 |
| 220 | 8.0 | 480 | 4.5 |
| 245 | 7.5 | 570 | 4.0 |
| 275 | 7.0 | 700 | 3.5 |
| 305 | 6.5 | 850 | 3.0 |

The correlated values in the above table provide an accurate means for estimating from the lacquer deposits determined for a given oil the piston varnish rating to be obtained in the standard FL-2 Chevrolet engine test.

In the test where the piston varnish ratings are obtained, a given lubricating oil composition is tested as the crankcase lubricant in a 6-cylinder Chevrolet engine using a low grade gasoline especially prone to cause engine deposits, the conditions being those defined in the standard FL-2 test procedure as described in the June 21, 1948, report of the Coordinating Research Council. This procedure requires the maintenance of a jacket temperature of 95° F. and a crankcase oil temperature of 155° F. at 2500 r.p.m. and 45 brake horsepower of 40 hours, and therefore closely simulates the relatively "cold" engine conditions which are normally experienced in city driving. At the end of each test, the engine is dismantled and the amount of engine deposits on the piston determined and expressed as the piston varnish rating. This value is obtained by visually rating (on a scale of 0 to 10, with 10 representing the absence of any deposit) the amount of deposit on each piston skirt and averaging the individual ratings so obtained for the various pistons. Under the conditions of this test, a piston varnish rating of 4.5 is indicative of satisfactory performance, though preferably this rating should be 5 or above. The wear experienced by the piston rings during the test is also measured in certain cases and expressed in mgs. of metal lost per hour. 5 mgs. per hour is regarded as satisfactory, though preferably the loss should be 3 mgs. or less per hour. In the case of the base oil alone without the addition of any additives it is found that the Piston Varnish Rating is approximately 3.0 and the piston ring weight loss is 5.5 mgs./hr. On the other hand, as indicated by the data presented in Table III below, when the base oil is compounded with the indicated amounts of a copolymer, greatly superior results are obtained.

Table III

| Lubricant composition | Ratio of (1) monomer to (2) monomer to (3) monomer | Piston varnish rating | Lacquer deposit (milligrams) | Piston varnish rating (estimated from lacquer deposit) | Piston ring wear rate mg./hr. |
|---|---|---|---|---|---|
| Base Oil alone | | 3.0 | 850 | | 5.0 |
| 1.5% copolymer of (1) dodecyl methacrylate and (2) ethanolamine methacrylate (salt) in base oil | 7/1 | 5.3 | | | 2.1 |
| 1.5% copolymer of (1) dodecyl methacrylate and (2) dihydroxyethyl ethylenediamine methacrylate (salt) in base oil | 7/1 | 6.1 | | | 1.5 |
| 1.5% copolymer of (1) dodecyl methacrylate and (2) dihydroxyethyl ethylenediamine in base oil | 14/1 | 3.7 | | | 3.6 |
| 1.5% copolymer of (1) dodecyl methacrylate and (2) N-(2-hydroxyethyl)-methacrylamide in base oil | 7/1 | 6.3 | | | 2.5 |
| 1.5% copolymer of (1) dodecyl methacrylate and (2) tetraethylene-pentamine methacrylate (salt) in base oil | 7/1 | 3.9 | | | 2.8 |
| 2.5% copolymer of (1) allyl stearate, (2) dilauryl maleate and (3) lauryl N-(2-hydroxyethyl)-maleamate in base oil | 5/3/2 | 4.3 | | | 2.4 |
| 2.5% copolymer of (1) allyl stearate, (2) dilauryl maleate and (3) dihydroxyethyl ethylenediamine salt of monolauryl maleate in base oil | 5/5/2 | 3.7 | | | 0.64 |
| 2.5% copolymer of allyl stearate, (2) Di(ethylene glycol monoleate) maleate and (3) N,N'-Di(2-hydroxyethyl) ethylene diamine, ethylene glycol monooleate maleate (salt) in base oil | 3/2/1 | 3.9 | | | 0.64 |
| 1.5% copolymer of dodecyl methacrylate, and (2) 2-aminoethyl-2-hydroxyethyl amine methacrylate (salt) in base oil | 7/1 | 4.2 | | | |
| 1.5% copolymer of dodecyl methacrylate, (2) methacrylic acid, and (3) heptadecenyl-2-hydroxyethyl imidazoline methacrylate (salt) in base oil | 14/1/1 | 4.5 | | | |
| 2.8% copolymer of dodecyl methacrylate, (2) N,N'-Di-(2-hydroxyethyl) maleamide, and (3) N-2-hydroxyethyl maleamic acid in base oil | 60/3/1 | | 450 | 4.9 | |
| 2.8% copolymer of (1) dodecyl methacrylate, (2) allyl stearate and (3) N,N'-Di-(di-2-hydroxyethyl) maleamide in base oil | 15/1/1 | | 405 | 5.2 | |
| 2.8% copolymer of (1) vinyl 2-ethylhexanoate, (2) di-(tetraethylene pentamine) itaconate and (3) tetraethylene pentamine acid itaconate in base oil | 110/1/4 | | 826 | 3.2 | |
| 2.8% copolymer of (1) tridecyl methacrylate, (2) octadecyl methacrylate, and (3) N,N-dimethylaminopropyl methacrylamide in base oil | 9/6/1 | | 290 | 6.9 | |

The utility of still other lubricant compositions in accordance with the invention in which various representative oils of lubricating viscosity are employed is illustrated by the additional examples given in the following table.

Table IV

| Lubricant composition | Base oil | Ratio of (1) monomer to (2) monomer to (3) monomer | Viscosity at 100 °F. SSU | Viscosity at 210 °F. SSU | Viscosity index |
|---|---|---|---|---|---|
| Base oil alone | Octyloxyoctapropylene glycol acetate | | 86.64 | 39.81 | 170 |
| 2.8% copolymer of (1) dodecyl methacrylate, (2) N,N'-di-(2-hydroxyethyl) maleamide, and (3) N-2-hydroxyethyl maleamic acid in base oil. | ____do____ | 60/3/1 | 135.4 | 52.07 | 176 |
| 2.8% copolymer of (1) vinyl 2-ethylhexanoate, (2) di-(tetraethylene pentamine) itaconate, and (3) tetraethylene pentamine acid itaconate in base oil. | ____do____ | 110/1/4 | 106.0 | 42.85 | 164 |
| Base oil alone | Mixed hexyl-octyl orthosilicate | | 45.19 | 33.52 | 183 |
| 2.8% copolymer of (1) vinyl 2-ethylhexanoate, (2) di-(tetraethylene pentamine) itaconate, and (3) tetraethylene pentamine acid itaconate in base oil. | ____do____ | 110/1/4 | 51.88 | 35.77 | 214 |
| 2.8% copolymer of (1) tridecyl methacrylate, (2) octadecyl methacrylate, and (3) N,N-dimethylaminopropyl-methacrylamide in base oil. | ____do____ | 9/6/1 | 63.33 | 40.29 | 212 |
| Base oil alone | Dioctyl phthalate | | 139.8 | 40.28 | 10 |
| 2.8% copolymer of (1) dodecyl methacrylate, (2) N,N'-(2-hydroxyethyl) maleamide, and (3) N-2-hydroxyethyl maleamic acid in base oil. | ____do____ | 60/3/1 | 297.7 | 58.04 | 129 |
| 2.8% copolymer of (1) vinyl 2-ethylhexanoate, (2) di-(tetraethylene pentamine) itaconate and (3) tetraethylene pentamine acid itaconate in base oil. | ____do____ | 110/1/4 | 181.4 | 44.31 | 81 |
| 2.8% copolymer of (1) tridecyl methacrylate, (2) octadecyl methacrylate, and (3) N,N-dimethylaminopropyl-methacrylamide in base oil. | ____do____ | 9/6/1 | 281.6 | 56.5 | 129 |

From the tests of the foregoing table, it will be seen that each of the illustrative compositions containing the copolymeric lubricating oil additives according to the invention possesses improved lubricating properties compared to the base oils alone.

In the foregoing description of the invention, the term "hydrocarbyl" is used with reference to the class of organic groups commonly known as "hydrocarbon groups." As employed herein, this term is considered to be a more convenient and concise generic expression for describing said hydrocarbon groups.

We claim:

1. As a new composition of matter an oil-soluble copolymer of (A) a polymerizable oil-solubilizing compound selected from the group consisting of olefinic hydrocarbons, olefinic ethers containing a single oxygen atom and hydrocarbon carboxylic acids containing at most two carboxy groups fully esterified with monohydroxy hydrocarbons, said compound having a single ethylenic linkage and containing a monovalent hydrocarbon group of from 10 to 20 aliphatic carbon atoms, (B) an amide of an α,β-ethylenically unsaturated monocarboxylic acid of from 3 to 6 carbon atoms wherein the amide nitrogen atom is attached to a substituted alkyl group of 2 to 7 carbon atoms which is substituted by at least one hydroxy group, and (C) α,β-ethylenically unsaturated monocarboxylic acid of from 3 to 6 carbon atoms, said copolymer having an apparent molecular weight of at least 2000 as determined by the light scattering method and a solubility in mineral lubricating oil of at least 2% by weight, said monomers being present in the copolymer in the ratio of from about 3 to 15 monomer units of the oil-solubilizing monomer (A) for each monomer unit of the amide (B) and the acid (C).

2. As a new composition of matter an oil-soluble copolymer of a higher alkyl methacrylate having from 10 to 20 carbon atoms in the alkyl group, N-(2-hydroxyethyl)-methacrylamide and methacrylic acid, said copolymer having an apparent molecular weight of at least 2000 as determined by the light scattering method and said components being present in the copolymer in the ratio of from about 3 to 15 monomer units of the methacrylate for each monomer unit of the amide and the acid, said copolymer having a solubility in mineral lubricating oil of at least 2% by weight.

References Cited in the file of this patent

UNITED STATES PATENTS

| | | |
|---|---|---|
| 2,311,548 | Jacobson | Feb. 16, 1943 |
| 2,508,717 | Jones | May 23, 1950 |
| 2,533,166 | Jones | Dec. 5, 1950 |
| 2,593,888 | Jones | Apr. 22, 1952 |
| 2,611,763 | Jones | Sept. 23, 1952 |
| 2,595,907 | Thomas et al. | May 6, 1952 |
| 2,680,110 | Loughran et al. | June 1, 1954 |
| 2,737,496 | Catlin | Mar. 6, 1956 |
| 2,892,821 | Stewart et al. | June 30, 1959 |